(12) United States Patent
Ishikawa

(10) Patent No.: US 7,157,869 B2
(45) Date of Patent: Jan. 2, 2007

(54) CONTROL SYSTEM AND CONTROL METHOD FOR MOTOR POWERED FOUR WHEEL DRIVE VEHICLE

(75) Inventor: Yasuki Ishikawa, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/986,357

(22) Filed: Nov. 12, 2004

(65) Prior Publication Data

US 2005/0104544 A1 May 19, 2005

(30) Foreign Application Priority Data

Nov. 14, 2003 (JP) .............. 2003-384958

(51) Int. Cl.
*H02P 1/00* (2006.01)
(52) U.S. Cl. ............ 318/139; 318/151; 318/727; 180/65.2; 180/65.4
(58) Field of Classification Search ............. 318/139, 318/151–154, 254, 802, 727; 180/65.2, 65.4
See application file for complete search history.

(56) References Cited

U.S. PATENT DOCUMENTS

| | | | |
|---|---|---|---|
| 4,477,766 A * | 10/1984 | Akita et al. ............ 322/28 |
| 4,616,166 A | 10/1986 | Cooper et al. |
| 5,942,818 A * | 8/1999 | Satoh et al. ............ 310/46 |
| 5,988,307 A * | 11/1999 | Yamada et al. ............ 180/243 |
| 6,066,928 A | 5/2000 | Kinoshita et al. |
| 6,148,784 A * | 11/2000 | Masberg et al. ......... 123/192.1 |
| 6,590,360 B1 * | 7/2003 | Hirata et al. ............ 318/727 |
| 6,930,460 B1 * | 8/2005 | Ishikawa et al. ........... 318/442 |
| 2001/0042649 A1 | 11/2001 | Maeda et al. |
| 2003/0146726 A1 | 8/2003 | Ishikawa et al. |

FOREIGN PATENT DOCUMENTS

| EP | 1 168 593 A2 | 1/2002 |
|---|---|---|
| JP | 2002-152911 A | 5/2002 |
| JP | 2002-200932 A | 7/2002 |

* cited by examiner

*Primary Examiner*—Rina Duda
(74) *Attorney, Agent, or Firm*—Foley & Lardner LLP

(57) ABSTRACT

A control system for controlling a vehicle which has an engine for driving front wheels thereof and a motor for driving rear wheels thereof. The control system includes: a motor generator which is driven by the engine and generates three-phase alternating-current power at first voltage; an inverter which converts the three-phase alternating-current power to direct-current power at second voltage lower than the first voltage; a battery to be charged with the direct-current power supplied from the inverter; and a capacitor device connected to the inverter. The motor of the vehicle is supplied with third power at third voltage converted from the first alternating-current power.

11 Claims, 7 Drawing Sheets

FIG. 6

| OPERATION MODE | 42V ALT | INVERTER | 14V BAT | DLC | SW1 | SW2 | SW3 | REAR WHEEL DRIVE MOTOR | DESCRIPTION |
|---|---|---|---|---|---|---|---|---|---|
| ENGINE START-UP | MOTOR FUNCTION | POWER OPERATION | CHARGE OR DISCHARGE | DISCHARGE | OFF | ON | OFF | NOT IN OPERATION | • FEED POWER DISCHARGED FROM DLC TO 42V ALT TO START ENGINE (DLC VOLTAGE IS INCREASED BEFOREHAND) |
| CHARGING BATTERY | POWER GENERATOR FUNCTION | REGENERATIVE OPERATION | CHARGE | HOLD | ON | OFF | OFF | NOT IN OPERATION | • GENERATE POWER BY 42V ALT<br>• PUT INV IN REGENERATIVE OPERATION TO CHARGE 14V BAT |
| CHARGING DLC | POWER GENERATOR FUNCTION | REGENERATIVE OPERATION | CHARGE OR DISCHARGE | CHARGE | OFF | ON | OFF | NOT IN OPERATION | • GENERATE POWER BY 42V ALT<br>• PUT INV IN REGENERATIVE OPERATION TO CHARGE DLC |
| 4WD | POWER GENERATOR FUNCTION | NOT IN OPERATION | STOP CHARGING | HOLD | OFF | OFF | ON | IN OPERATION | • GENERATE POWER BY 42V ALT<br>• CONVERT AC TO DC TO FEED REAR WHEEL DRIVE MOTOR |

FIG. 8

| OPERATION MODE | 42V ALT | INVERTER | 14V BAT | 42V BAT | SW1 | SW2 | H BRIDGE | REAR WHEEL DRIVE MOTOR | DESCRIPTION |
|---|---|---|---|---|---|---|---|---|---|
| ENGINE START-UP | MOTOR FUNCTION | POWER OPERATION | — | DISCHARGE | OFF | ON | NOT IN OPERATION | NOT IN OPERATION | • FEED POWER FROM 14V BAT THROUGH INV TO 42V ALT TO START ENGINE |
| CHARGING 14V BATTERY | POWER GENERATOR FUNCTION | REGENERATIVE OPERATION | CHARGE | — | ON | OFF | NOT IN OPERATION | NOT IN OPERATION | • GENERATE POWER BY 42V ALT<br>• PUT INV IN REGENERATIVE OPERATION TO CHARGE 14V, 42V BAT |
| 4WD | POWER GENERATOR FUNCTION | REGENERATIVE OPERATION | STOP CHARGING | CHARGE | OFF | OFF | IN OPERATION | IN OPERATION | • GENERATE POWER BY 42V ALT<br>• PUT H BRIDGE IN OPERATION TO FEED POWER TO REAR WHEEL DRIVE MOTOR |
| CHARGING 42V BATTERY | POWER GENERATOR FUNCTION | REGENERATIVE OPERATION | — | CHARGE | OFF | ON | NOT IN OPERATION | NOT IN OPERATION | • CHARGE 42V BATTERY BY 42V ALT |

US 7,157,869 B2

CONTROL SYSTEM AND CONTROL METHOD FOR MOTOR POWERED FOUR WHEEL DRIVE VEHICLE

BACKGROUND OF THE INVENTION

1. Field of the Invention

The present invention relates to a control system and a control method for controlling a four wheel drive (4WD) vehicle, in which either one of a pair of front wheels or a pair of rear wheels are driven by an engine and the other pair of wheels are driven by a motor.

2. Description of Related Art

Japanese Patent Application Laid-open Publications No. 2002-152911 and 2002-200932 disclose a 4WD vehicle in which front wheels thereof are driven by an engine and rear wheels thereof are driven by a motor. Electric power to be supplied to the motor is generated by a power generator driven by the engine.

SUMMARY OF THE INVENTION

In the above-described vehicle, the power generator for the motor is provided separately from a power generator for electric equipments of the vehicle. Accordingly, the number of parts/equipments is increased and spaces are wasted. Further, the weight and costs of the vehicle are increased.

An object of the present invention is to provide a control system and a control method for controlling a motor powered 4WD vehicle, which provide a simplified system configuration.

An aspect of the present invention is a control system for controlling a vehicle which has an engine for driving at least one of wheels thereof and a motor for driving at least one of the rest of the wheels thereof, the control system comprising: a motor generator configured to be driven by the engine for generating first alternating-current power at first voltage; an inverter which converts the first alternating-current power to second power at second voltage lower than the first voltage; a first battery to be charged with the second power supplied from the inverter; and a capacitor device connected to the inverter, wherein the motor is supplied with third power at third voltage converted from the first alternating-current power.

BRIEF DESCRIPTION OF THE DRAWINGS

The invention will now be described with reference to the accompanying drawings wherein:

FIG. 6 is a table for describing operation states of respective devices in the control system for a motor powered 4WD vehicle according to the first embodiment.

FIG. 8 is a table for describing operation states of respective devices in the control system for a motor powered 4WD vehicle according to the second embodiment.

DETAILED DESCRIPTION OF THE PREFERRED EMBODIMENT

Figure 1:
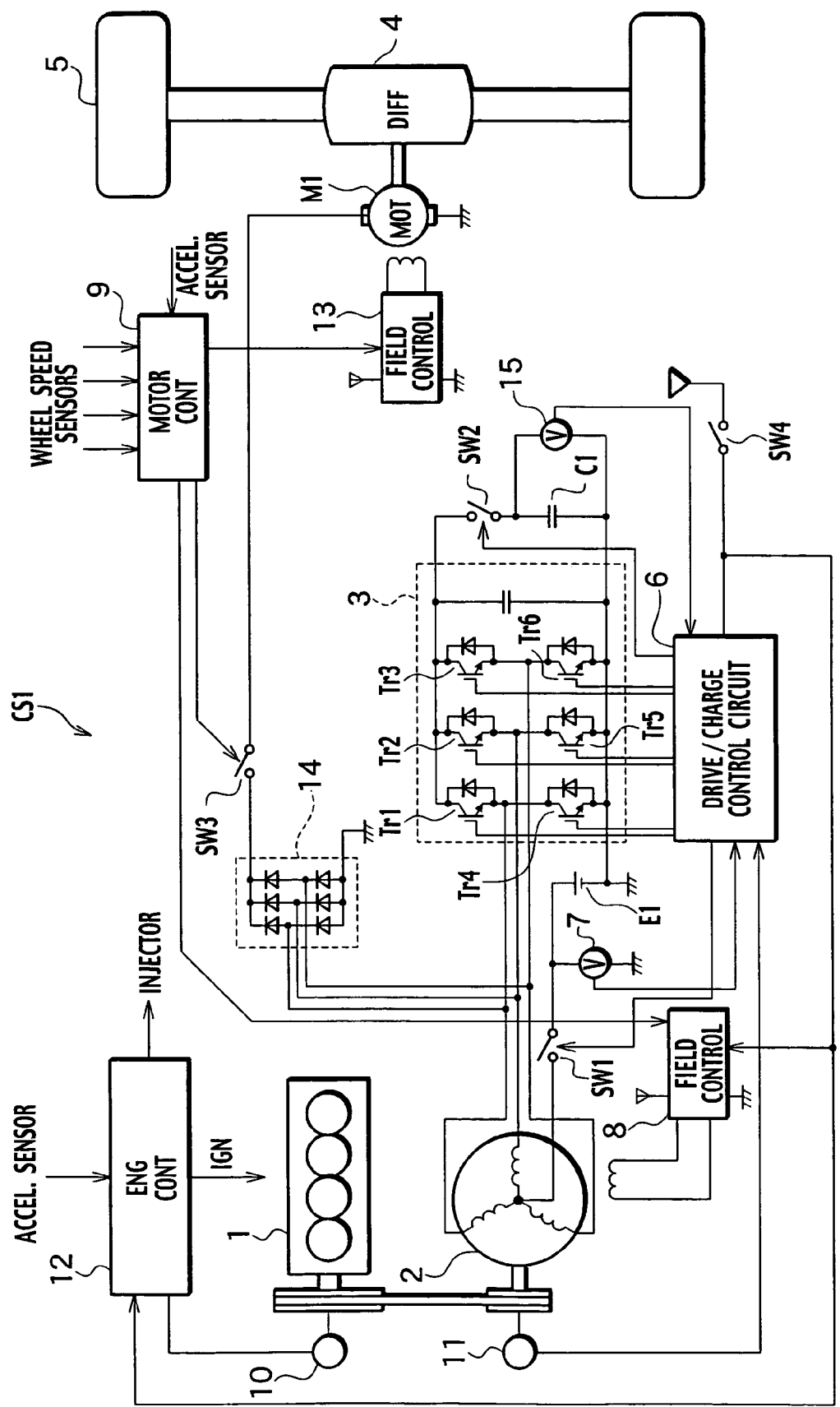
FIG. 1 is a block diagram showing a configuration of a control system for a motor powered 4WD vehicle according to a first embodiment of the present invention.

Embodiments of the present invention will be explained below with reference to the drawings, wherein like members are designated by like reference characters.

A control system CS1 according to a first embodiment of the present invention controls a vehicle, in which either one of a pair of front wheels or a pair of rear wheels are driven by an engine and the other pair of wheels are driven by a motor. As shown in FIG. 1, the system CS1 includes an engine 1, a 42-V alternator (a motor generator) 2 which is connected to the engine 1 through a belt and generates three-phase alternating-current power at 42 V (a first rated voltage) by use of torque of the engine 1, a 14-V battery E1 (a first battery) for supplying electric power at 14 V (a second rated voltage) to various electric devices mounted on the vehicle, and a capacitor (an electric double layer capacitor (DLC); a capacitor device) C1 for supplying driving force to the 42-V alternator 2 when starting the engine.

The system CS1 further includes a step-up and step-down inverter 3. The step-up and step-down inverter 3 converts the three-phase alternating-current power outputted from the 42-V alternator 2 into direct-current power and thereby charges the capacitor C1 up to a predetermined voltage, and supplies electric power for charging the 14-V battery E1. In addition, the step-up and step-down inverter 3 converts the direct-current power discharged from the capacitor C1 into three-phase alternating-current power and increases voltage thereof. The three-phase alternating-current power is supplied to the 42-V alternator 2. The 42-V alternator 2 includes a rotational position sensor 11 which detects a rotational position of the 42-V alternator 2.

The system CS1 further includes a rectifier circuit 14 which converts the three-phase alternating-current power generated by the 42-V alternator 2 into direct-current power. The obtained direct-current power is supplied to a motor M1.

An output shaft of the motor M1 is connected to rear wheels 5 through a differential 4. Here, an example of driving the rear wheels 5 with the motor M1 will be explained. However, when driving the rear wheels 5 with the engine power, the motor M1 drives front wheels instead.

In addition, the system CS1 includes an engine controller 12, a motor controller 9 for controlling the drive of the motor M1, and a drive/charge control circuit 6. The engine controller 12 outputs an ignition signal to the engine 1 and controls an injector based on a detection signal of the revolution sensor 10 provided on the engine 1 and on a detection signal of an accelerator sensor (not shown). The drive/charge control circuit 6 controls the drive of the step-up and step-down inverter 3 and of the 42-V alternator 2, and also controls the charge and discharge of the capacitor C1 and the 14-V battery E1.

A detection signal of a wheel speed sensor (not shown) and the detection signal of the accelerator sensor are inputted to the motor controller 9. Based on the respective detection signals, the motor controller 9 opens and closes a switch (a third switch) SW3 provided between the rectifier circuit 14 and the motor M1, and also outputs a control signal to a field controller 13 for controlling a field current of the motor M1 (a current flowing in a field coil).

The 42-V alternator 2 is provided with a field controller 8 for controlling a field current of the 42-V alternator 2. This field controller 8 is operated under control of the drive/charge control circuit 6 and the engine controller 12.

The step-up and step-down inverter 3 includes six switching elements Tr1 to Tr6 of insulated gate bipolar transistors (IGBTs), metal oxide semiconductor field effect transistors (MOS-FETs), or the like. A bus on a ground side of the step-up and step-down inverter 3 is connected to a negative terminal of the 14-V battery E1. A positive terminal of the 14-V battery E1 is connected through a switch (a first switch) SW1 to a neutral point of three-phase field coils of the 42-V alternator 2. In addition, a voltage sensor 7 is provided for measuring the terminal voltage of the 14-V battery E1.

Meanwhile, a serial connection circuit of a switch (a second switch) SW2 to be opened and closed under control of the drive/charge control circuit 6 and the capacitor C1 is provided at subsequent stage to the step-up and step-down inverter 3. Moreover, a voltage sensor 15 for detecting the terminal voltage of the capacitor C1 is connected in parallel with the capacitor C1.

An operation signal of an accelerator switch SW4, detection signals of the voltage sensors 7 and 15, and a detection signal of the rotational position sensor 11 are inputted to the drive/charge control circuit 6. Upon receipt of these signals, the drive/charge control circuit 6 outputs driving signals to control input terminals of the six switching elements Tr1 to Tr6 in the step-up and step-down inverter 3. Further, the drive/charge control circuit 6 outputs control signals to the switch SW1 and to the switch SW2 for opening and closing the switches.

In the system CS1, by allowing the step-up and step-down inverter 3 to perform a powering operation while turning the switch SW1 off and turning the switch SW2 on under control of the drive/charge control circuit 6 and turning the switch SW3 off under control of the motor controller 9, it is possible to convert the direct-current power discharged from the capacitor C1 into the three-phase alternating-current power, to use the 42-V alternator 2 as an electric motor, feeding this three-phase alternating-current power, and thereby to start the engine 1.

Meanwhile, by allowing the step-up and step-down inverter 3 to perform a regenerative operation by turning the switch SW1 on, turning the switch SW2 and the switch SW3 off, and using the 42-V alternator 2 as a power generator, it is possible to rectify the three-phase alternating-current power generated by the 42-V alternator 2 and lower the voltage thereof, and to charge the 14-V battery E1 with the direct-current power after lowering voltage and rectification.

In addition, by allowing the step-up and step-down inverter 3 to perform a regenerative operation by turning the switch SW1 off, turning the switch SW2 on, turning the switch SW3 off, and using the 42-V alternator 2 as a power generator, it is possible to convert the three-phase alternating-current power generated by the 42-V alternator 2 into the direct-current power, and to charge the capacitor C1 with this direct-current power.

In addition, by stopping the step-up and step-down inverter 3 while turning the switches SW1 and SW2 off and turning the switch SW3 on, it is possible to rectify the three-phase alternating-current power generated by the 42-V alternator 2 using the rectifier circuit 14. Moreover, by supplying the rectified power to the motor M1, it is possible to power the motor M1 and thereby to allow the vehicle to perform 4WD drive.

Next, operations of the control system CS1 will be described in terms of (A) starting the engine, (B) charging the 14-V battery, (C) charging the capacitor C1, and (D) driving in 4WD mode, respectively. Here, actions of the 42-V alternator 2, the step-up and step-down inverter 3, the 14-V battery E1, the capacitor C1, the switches SW1, SW2, and SW3, and the motor M1 in the respective operations are as shown in FIG. 6.

(A) Operation when Starting the Engine

Figure 2:
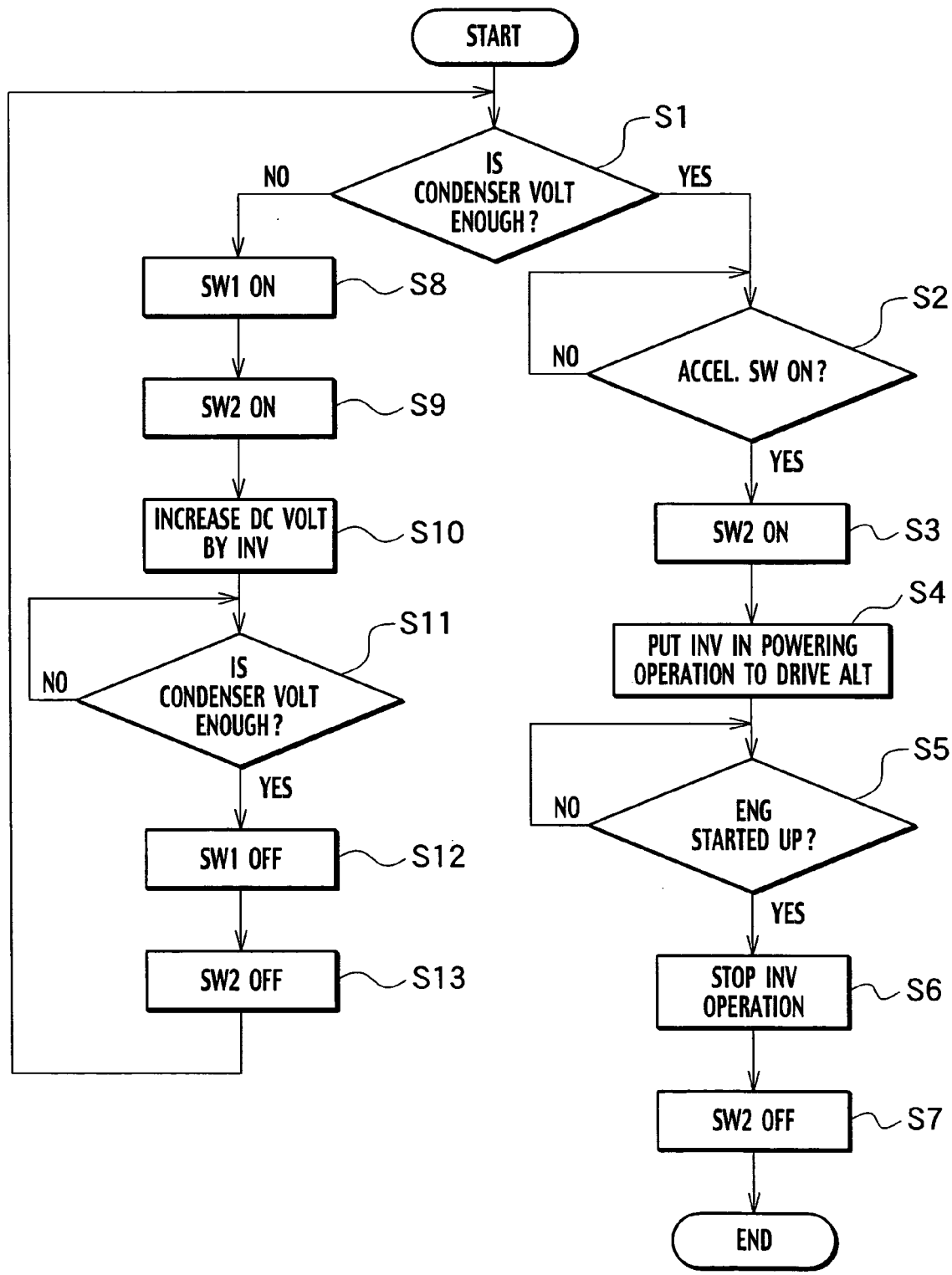
FIG. 2 is a flowchart showing an operation of the control system for a motor powered 4WD vehicle according to the first embodiment when starting an engine.

FIG. 2 is a flowchart showing an operation process when starting the engine. Firstly, in Step S1, a judgment is made as to whether the terminal voltage of the capacitor C1 (28 to 42 V) reaches a predetermined voltage (28 V) based on an output signal from the voltage sensor 15.

When the terminal voltage reaches the predetermined voltage, a judgment is made as to whether the accelerator switch SW4 is on or not in Step S2. When the accelerator switch SW4 is on, the switch SW2 is turned on under control of the drive/charge control circuit 6 in Step S3.

In this way, the terminal voltage of the capacitor C1 is applied to the step-up and step-down inverter 3. Accordingly, in Step S4, the step-up and step-down inverter 3 is allowed to perform the powering operation, whereby the three-phase alternating-current power (approximately 1 kW (kilowatts) at the maximum) at approximately 40 Vrms (root mean squared voltage) generated by the step-up and step-down inverter 3 is applied to the 42-V alternator 2. Therefore, the 42-V alternator 2 operates as an electric motor and cranks the engine 1. Simultaneously, the engine controller 12 outputs the ignition signal to the engine 1 and outputs a fuel injection signal to the injector. Accordingly, the engine 1 is completely ignited and started in Step S5. Thereafter, the drive of the step-up and step-down inverter 3 is stopped in Step S6, and the switch SW2 is turned off in Step S7.

In this way, it is possible to start the engine 1 by use of the electric power (approximately 1 kW at the maximum) discharged from the capacitor C1.

Meanwhile, when the judgment is made in Step S1 that the terminal voltage of the capacitor C1 does not reach the predetermined voltage (28V), the switches SW1 and SW2 are turned on in Steps S8 and S9. Subsequently, the step-up and step-down inverter 3 is driven in Step S10. Accordingly, the voltage (14 V at the maximum) of the direct-current power (approximately 1 kW at the maximum) discharged from the 14-V battery E1 is increased to 28 to 42 V, and the direct-current power (approximately 1 kW at the maximum) is supplied to the capacitor C1 for charging the capacitor C1.

Thereafter, when the judgment is made that the terminal voltage of the capacitor C1 reaches the predetermined voltage in Step S11, the step-up and step-down inverter 3 is stopped, and the switches SW1 and SW2 are turned off in Steps S12 and S13. In this way, when starting the engine 1, it is possible to charge the capacitor C1 with the direct-current power outputted from the 14-V battery E1 even in a case a terminal voltage of the capacitor C1 is not sufficient. Accordingly, starting the engine 1 is ensured.

(B) Operation when Charging the Battery

Figure 3:
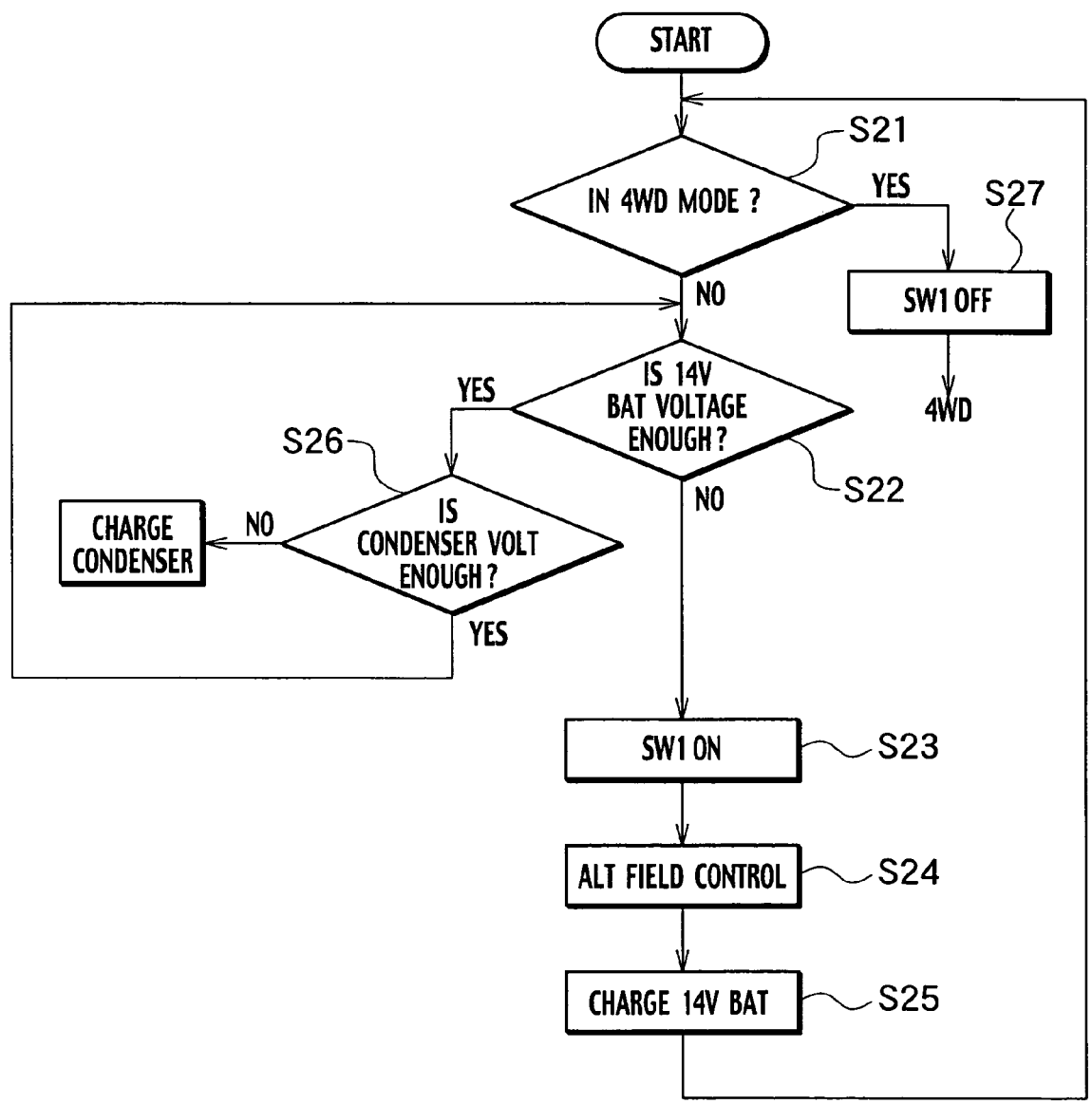
FIG. 3 is a flowchart showing an operation of the control system for a motor powered 4WD vehicle according to the first embodiment when charging a 14-V battery.

Next, an operation when charging the 14-V battery E1 will be described with reference to a flowchart shown in FIG. 3.

Firstly, in Step S21, a judgment is made as to whether the vehicle is in a 4WD mode, or in other words, whether the motor M1 is in operation. When the vehicle is not in the 4WD mode, the result of the judgment is NO in Step S21. In Step S22, a judgment is made as to whether the terminal voltage of the 14-V battery E1 reaches the predetermined voltage based on the detection signal of the voltage sensor 7. As a consequence, when the terminal voltage does not reach the predetermined voltage, the result of the judgment is NO in Step S22. Then the switch SW1 is turned on in Step S23. In addition, in step S24, the field controller 8 performs the field control of the 42-V alternator 2. Then, the electric power (approximately 4 kW at the maximum) at 11 to 42

Vrms generated by the 42-V alternator 2 is converted into a direct-current power (approximately 1 kW at the maximum) at lowered voltage of 14 V by the step-up and step-down inverter 3. In Step S25, the 14-V battery E1 is charged with this electric power.

Meanwhile, when the judgment is made that the vehicle is in the 4WD mode in Step S21, the electric power generated by the 42-V alternator 2 is used for driving the motor M1, and it is not possible to charge the 14-V battery E1. Accordingly, the switch SW1 is turned off in Step S27.

Meanwhile, when the judgment is made that the terminal voltage of the 14-V battery E1 reaches the predetermined voltage in Step S22, a judgment is made as to whether the terminal voltage of the capacitor C1 reaches a predetermined voltage in Step S26. When the terminal voltage does not reach the predetermined voltage, the result of the judgment is NO in Step S26. Then, an operation for charging the capacitor C1 (to be described later) is carried out.

In this way, when the vehicle is not in the 4WD mode, it is possible to charge the 14-V battery E1 with the electric power generated by the 42-V alternator 2. Accordingly, even in a case that a lot of electricity is discharged from the 14-V battery E1, it is possible to recover full charge of the battery E1 quickly. Power supply to various electric devices mounted on the vehicle is thus ensured.

(C) Operation when Charging the Capacitor C1

Next, an operation when charging the capacitor C1 will be described with reference to a flowchart shown in FIG. 4. When the result of the judgment is NO in the processing of Step S26 shown in FIG. 3, the operation for charging the capacitor C1 is carried out. The electric power discharged from the 14-V battery E1 is used in the processing from Steps S8 to S13 shown in FIG. 2, however, in this charging operation, the electric power to be used for charging is generated by the 42-V alternator 2 which is driven by the engine 1.

Figure 4:
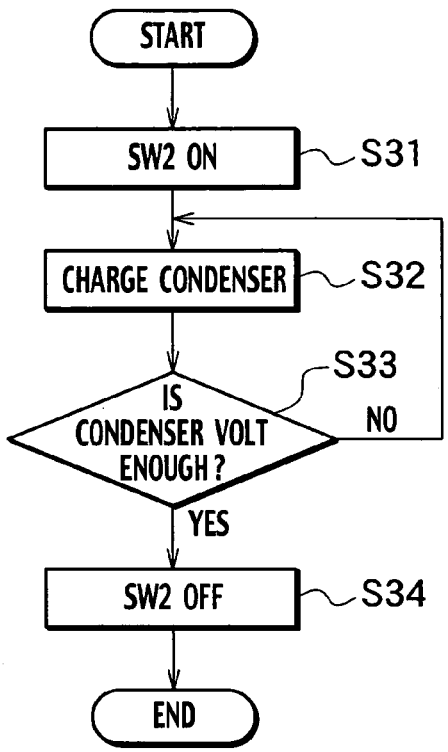
FIG. 4 is a flowchart showing an operation of the control system for a motor powered 4WD vehicle according to the first embodiment when charging an electric double layer capacitor.

Firstly, the switch SW2 is turned on in Step S31 shown in FIG. 4. Subsequently, in Step S32, the electric power generated by the 42-V alternator 2 is rectified and the voltage thereof is lowered to 28 to 42 V by the step-up and step-down inverter 3, and is supplied to the capacitor C1 at approximately 1 kW at the maximum for charging the capacitor C1.

Then, in Step S33, a judgment is made as to whether the terminal voltage of the capacitor C1 reaches the predetermined voltage based on the detection signal of the voltage sensor 15. When the terminal voltage reaches the predetermined voltage, in Step S34, the switch SW2 is turned off and the charging of the capacitor C1 is completed.

In this way, when the terminal voltage of the capacitor C1 does not reach the predetermined voltage, the charging of the capacitor C1 is carried out on the condition that the vehicle is not in the 4WD mode (when not driving the motor) and that the charge of the 14-V battery E1 is completed (when not charging the first battery). Accordingly, even when the terminal voltage of the capacitor C1 falls off, it is possible to fully charge the capacitor C1 quickly. In this way, it is possible to prepare for starting the engine.

(D) Operation in 4WD Mode

Figure 5:
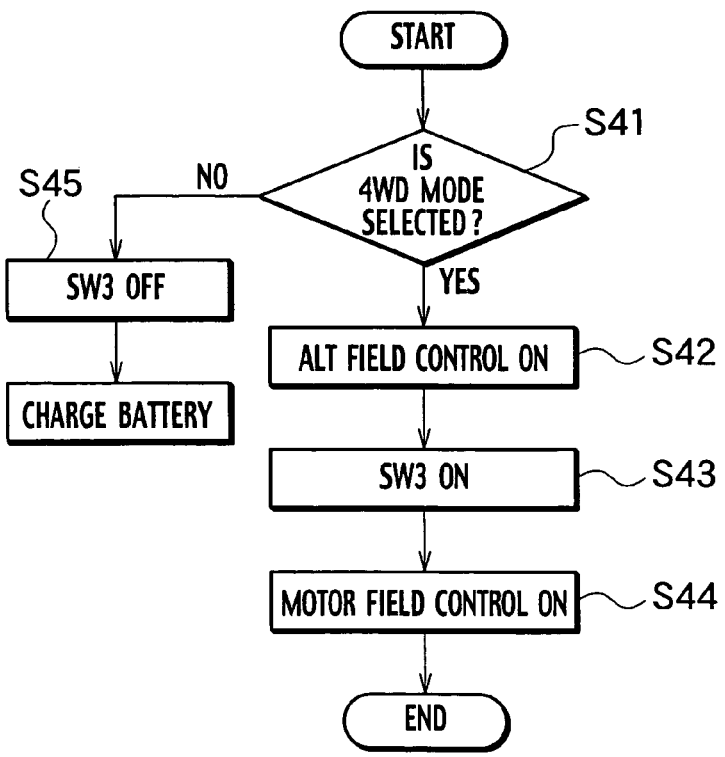
FIG. 5 is a flowchart showing an operation of the control system for a motor powered 4WD vehicle according to the first embodiment when driving a motor.

Next, an operation in the 4WD mode will be described with reference to a flowchart shown in FIG. 5. Firstly, in Step S41, the motor controller 9 determines whether or not the 4WD drive is to be performed based on the detection signal of the wheel speed sensor and on the detection signal of the accelerator sensor. When performing the 4WD drive, in Step S42, the drive/charge control circuit 6 outputs an instruction signal to the field controller 8 to apply a field current thereto. In this way, the field current of the 42-V alternator 2 becomes controllable.

Thereafter, the switch SW3 is turned on in Step S43. Accordingly, the electric power generated by the 42-V alternator 2 and rectified by the rectifier circuit 14 becomes feedable to the motor M1.

Further, in Step S44, the motor controller 9 outputs another instruction signal to the field controller 13 to apply a field current thereto. In this way, the field current of the motor M1 becomes controllable.

Then, a shaft of the 42-V alternator 2 is rotated by use of the torque of the engine 1 and the 42-V alternator 2 is thereby operated as the power generator. The three-phase alternating-current power generated by the 42-V alternator 2 is rectified by the rectifier circuit 14, and the electric power (approximately 4 kW at the maximum) at voltage of 16 to 60 V obtained by the rectification is fed to the motor M1, thereby powering the motor M1. The 4WD mode is thus achieved by driving the front wheels with the engine 1 and driving the rear wheels with the motor M1.

In this way, in the 4WD mode, it is possible to drive the 42-V alternator 2 by the torque of the engine 1, then to rectify the three-phase alternating-current power generated by the 42-V alternator 2 by the rectifier circuit 14, and thereby to power the motor M1 by use of this direct-current power.

As described above, in the control system CS1, when driving the engine 1, it is possible to rectify the electric power generated by the 42-V alternator 2 and lower the voltage thereof using the step-up and step-down inverter 3, and thereby to charge the 14-V battery E1 and the capacitor C1 with the rectified power. Moreover, in the 4WD mode, it is possible to rectify the three-phase alternating-current power generated by the 42-V alternator 2 using the rectifier circuit 14, to supply the rectified power to the motor M1 for powering the motor M1. Therefore, by using the 42-V alternator 2, it is possible to obtain both of the first rated voltage for driving the motor M1 and the second rated voltage for charging the 14-V battery E1, to thereby supply the electric power to the motor M1 and the 14-V battery E1, respectively. Accordingly, it is possible to simplify a system configuration, to provide flexibility in layout, and to reduce weight and cost.

In other words, the motor generator is used commonly to supply the electric power to the motor in the 4WD mode and to supply the electric power when charging the first battery. Accordingly, it is possible to simplify the system configuration, to provide flexibility in layout, and to reduce weight and cost.

Moreover, the step-up and step-down inverter 3 converts the three-phase alternating-current power generated by the 42-V alternator 2 into the direct-current power and thereby to charge the 14-V battery E1 with the direct-current power. Accordingly, it is not necessary to prepare any other rectifier circuit to generate the charge power to the 14-V battery E1. In this way, it is possible to simplify the system configuration.

In other words, the step-up and step-down inverter 3 converts the three-phase alternating-current power generated by the motor generator 2 into the direct-current power at a lowered voltage. The direct-current power is then supplied to the first battery for charging the first battery. Accordingly, it is not necessary to mount any other rectifier circuit. In this way, it is possible to simplify the system configuration.

In addition, when starting the engine 1, the electric power discharged from the capacitor C1 is converted into a three-phase alternating voltage at the first rated voltage by use of the step-up and step-down inverter 3, and this three-phase alternating power is supplied to the 42-V alternator 2 to rotate the shaft of the 42-V alternator 2 and thereby to start the engine 1. Accordingly, no other power source is required. It is thus possible to simplify the system configuration.

In other words, when starting the engine, the electric power discharged from the capacitor device is converted into the three-phase alternating voltage at the first rated voltage by use of the step-up and step-down inverter 3. By using the three-phase alternating power, it is possible to rotate a shaft of the motor generator and thereby to start the engine. Accordingly, no other power source is required. In this way, it is possible to simplify the system configuration.

Meanwhile, if the terminal voltage of the capacitor C1 does not reach the predetermined voltage when starting the engine 1, the voltage of the electric power discharged from the 14-V battery E1 is increased by the step-up and step-down inverter 3 and the electric power at the increased voltage is supplied to the capacitor C1 for charging the capacitor C1. Thereafter, the engine 1 is started by use of the power discharged from the capacitor C1. Accordingly, it is possible to ensure starting the engine 1 even in a case that the terminal voltage of the capacitor C1 is low.

In other words, if the terminal voltage of the capacitor device does not reach the predetermined voltage when starting the engine, the capacitor device is charged to have the predetermined voltage with the electric power discharged from the first battery. Accordingly, it is possible to ensure starting the engine even in a case that the terminal voltage of the capacitor C1 is low.

In addition, when the accelerator switch SW4 is tuned on, the engine 1 is started, being fed with the electric power discharged from the capacitor C1. Accordingly, it is possible to realize an idle stop operation in which the engine is temporarily stopped only while the vehicle is not in motion, thereby improving gas mileage.

In other words, the engine is started when a predetermined condition is satisfied, or for example, when it is detected that the accelerator switch is turned on. Accordingly, it is possible to realize the idle stop operation, thereby improving gas mileage.

Meanwhile, the three-phase alternating-current power generated by the 42-V alternator 2 is rectified by use of the rectifier circuit 14, and the rectified power is supplied to the motor M1. Accordingly, it is possible to obtain the direct-current power for driving the motor M1 without using the step-up and step-down inverter 3.

In other words, the three-phase alternating-current power generated by the motor generator is rectified by use of the rectifier circuit 14, and this power is supplied to the motor. Accordingly, it is possible to obtain the direct-current power for driving the motor without using the step-up and step-down inverter.

Moreover, the capacitor C1 is charged when the motor M1 is not powered and when the 14-V battery E1 is not charged. Accordingly, even when the terminal voltage of the capacitor C1 falls off, it is possible to increase the terminal voltage quickly and thereby to prepare for starting the engine 1 next time.

In other words, the capacitor device is charged when not driving the motor and when not charging the first battery. Accordingly, it is possible to keep the terminal voltage of the capacitor device equal to or above the predetermined voltage at any time and get the system ready for starting the engine.

Meanwhile, the control system includes the switches SW1, SW2, and SW3. The operations of the system: the start of the engine 1, the charge of the 14-V battery E1, the charge of the capacitor C1, and the drive of the motor M1, are switched by opening and closing the respective switches. Accordingly, it is possible to ensure the smooth and safe switching operations and thereby to improve the system reliability.

In other words, by using the first switch, the second switch, and the third switch, and by opening and closing these switches appropriately, it is possible to switch the start of the engine, the charging of the first battery, the charging of the capacitor device, and the drive of the motor. Accordingly, it is possible to ensure the switching operations and thereby to improve reliability of the operations.

Next, a second embodiment of the present invention will be described. FIG. 6 is a block diagram showing a configuration of a control system CS2 for a motor powered 4WD vehicle according to the second embodiment. As shown in the drawing, the control system CS2 includes the engine 1, the 42-V alternator (the motor generator) 2, the step-up and step-down inverter 3, the 14-V battery E1, the motor controller 9, the field controller 8, the drive/charge control circuit 6, the engine controller 12, the revolution sensor 10, the rotational position sensor 11, the voltage sensor 7, and the switch (the first switch) SW1 as similar to the above-described first embodiment.

Moreover, in the system CS2, a serial connection circuit of the switch (the second switch) SW2 and a 42-V battery (a second battery: a capacitor device) E2 is provided at subsequent stage to the step-up and step-down inverter 3. Moreover, the system CS2 includes a voltage sensor 16 for detecting the terminal voltage of the 42-V battery E2. Here, it is also possible to use an electric double layer capacitor DLC (a capacitor device) instead of the 42-V battery E2.

Further, an H-bridge circuit 18 including four switching elements Tr11 to Tr14 is provided at subsequent stage to the serial connection circuit composed of the switch SW2 and the 42-V battery E2. Moreover, a permanent magnet direct-current motor M2 is provided at subsequent stage to the H-bridge circuit 18. The motor M2 is connected to the rear wheels 5 through the differential 4 as similar to the above-described first embodiment.

The system CS2 further includes a drive circuit 17 for controlling on and off operations of the respective switching elements Tr11 to Tr14 in the H-bridge circuit 18. By turning the respective switching elements Tr11 to Tr14 on and off under control of the drive circuit 17, it is possible to control driving or stopping the motor M2 and a direction of rotation of the motor M2.

Figure 7:
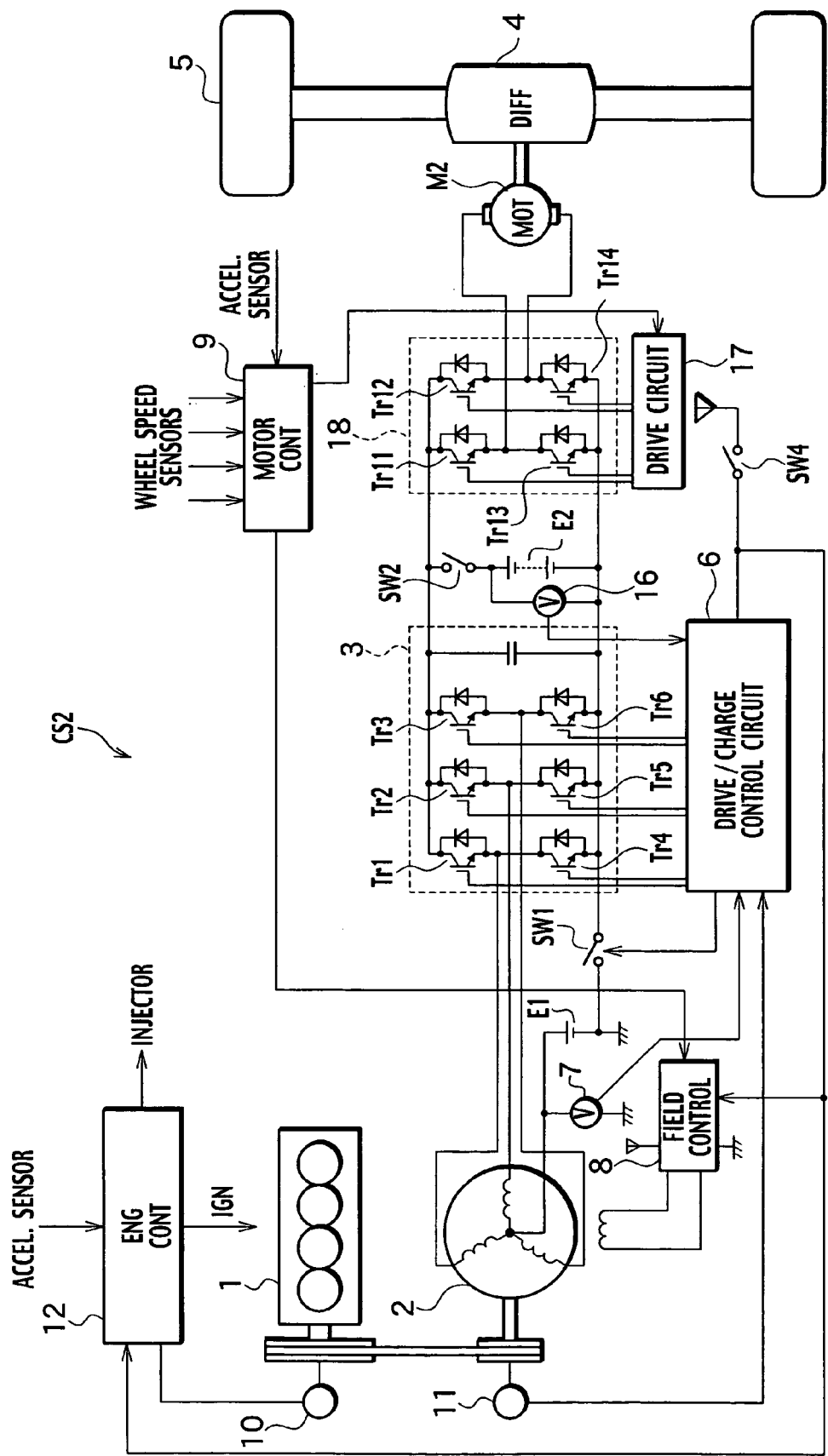
FIG. 7 is a block diagram showing a configuration of a control system for a motor powered 4WD vehicle according to a second embodiment of the present invention.

Next, operations of the control system CS2 will be described. Here, actions to be taken when starting the engine, charging the 14-V battery, driving in the 4WD mode, and when charging the 42-V battery are as shown in FIG. 7.

Firstly, the drive/charge control circuit 6 starts the engine 1 when detecting that the accelerator switch SW4 is turned on. When starting the engine 1, the switch SW2 is turned on and the switch SW1 is turned off. Moreover, the H-bridge circuit 18 is set to an off-state.

In this state, the direct-current power discharged from the 42-V battery E2 is supplied to the step-up and step-down inverter 3, and the step-up and step-down inverter 3 converts the direct-current power at 42 V into the three-phase alternating-current power. Then, this three-phase alternating-current power is supplied to the 42-V alternator 2. Accordingly, the 42-V alternator 2's shaft is rotated, functioning as a motor. By use of the torque thereof, the engine 1 is started.

Meanwhile, when a judgment is made that the terminal voltage of the 42-V battery E2 does not reach a predetermined voltage based on a detection signal of the voltage sensor 16, an operation for charging the 42-V battery E2 is carried out by use of the electric power discharged from the 14-V battery E1. Specifically, the switch SW1 is turned on, and the voltage of the direct-current power discharged from the 14-V battery E1 is increased by the step-up and step-down inverter 3. The 42-V battery E2 is charged with this electric power. Then, after the terminal voltage of the 42-V battery E2 reaches the predetermined voltage by this charging operation, the above-described operation is carried out to start the engine 1.

Meanwhile, when a judgment is made that the terminal voltage of the 14-V battery E1 drops below the predetermined voltage when starting the engine 1, the switch SW1 is turned on and the switch SW2 is turned off. In this state, the electric power generated by the 42-V alternator 2 is rectified and the voltage thereof is lowered by the step-up and step-down inverter 3. The electric power thus stepped down and rectified is supplied to the 14-V battery E1 for charging the 14-V battery E1.

Moreover, when a judgment is made that the terminal voltage of the 42-V battery E2 drops below the predetermined voltage when starting the engine 1, the switch SW1 is turned off and the switch SW2 is turned on. In this state, the electric power generated by the 42-V alternator 2 is rectified and supplied to the 42-V battery E2. In this way, it is possible to charge the 42-V battery E2 until the terminal voltage thereof reaches the predetermined voltage.

Meanwhile, when performing the 4WD under control of the motor controller 9, the switches SW1 and SW2 are turned off. In this state, the on and off states of the respective switching elements Tr11 to Tr14 in the H-bridge circuit 18 are controlled by the drive circuit 17. In this way, the electric power discharged from the 42-V battery E2 is converted into the electric power at the predetermined voltage, which is supplied to the motor M2. Accordingly, the rear wheels 5 are driven to rotate, achieving the 4WD operation.

In addition, when charging the 42-V battery E2, the switch SW2 is turned on and the switch SW1 is turned off. In this state, the three-phase alternating-current power generated by the 42-V alternator 2 is rectified by the step-up and step-down inverter 3, and the rectified power is supplied to the 42-V battery E2. In this way, it is possible to charge the 42-V battery E2.

As described above, according to the control system CS2 for a motor powered 4WD vehicle according to the second embodiment, when driving the engine 1, it is possible to rectify the electric power generated by the 42-V alternator 2 and lower the voltage thereof using the step-up and step-down inverter 3, and thereby to charge the 14-V battery E1 and the 42-V battery E2 similarly to the above-described first embodiment.

Moreover, in the 4WD mode, it is possible to rectify the three-phase alternating-current power generated by the 42-V alternator 2 using the step-up and step-down inverter 3, to supply the rectified power to the motor M2 through the H-bridge circuit 18, and thereby to drive the motor M2.

Therefore, by using the 42-V alternator 2, it is possible to obtain both the first rated voltage for driving the motor M2 and the second rated voltage for charging the 14-V battery E1, and to supply the electric power respectively to the motor M2 and to the 14-V battery E1. Accordingly, it is possible to simplify a system configuration, to provide flexibility in layout, and to reduce weight and cost.

Meanwhile, the step-up and step-down inverter 3 converts the three-phase alternating-current power generated by the 42-V alternator 2 into the direct-current power which is supplied to the 14-V battery E1 for charging the 14-V battery E1 and also supplied to the motor M2 for driving the motor M2. This eliminates the necessary to prepare any other rectifier circuit. It is thus possible to simplify the system configuration.

In addition, when starting the engine 1, the electric power discharged from the 42-V battery E2 is converted into a three-phase alternating voltage at the first rated voltage by use of the step-up and step-down inverter 3, and this three-phase alternating voltage is supplied to the 42-V alternator 2 to rotate the 42-V alternator 2' shaft and thereby to start the engine 1. Accordingly, no other power source is required. In this way, it is possible to simplify the system configuration.

Meanwhile, if the terminal voltage of the 42-V battery E2 does not reach the predetermined voltage when starting the engine 1, the voltage of the electric power discharged from the 14-V battery E1 is increased by the step-up and step-down inverter 3 and the electric power at the increased voltage is supplied to the 42-V battery E2 for charging the 42-V battery E2. Thereafter, the engine 1 is started by use of the power discharged from the 42-V battery E2. Accordingly, it is possible to ensure that the engine 1 starts even in the case that the terminal voltage of the 42-V battery E2 is low.

In addition, when the accelerator switch SW4 is turned on, the engine 1 is started by use of the electric power discharged from the 42-V battery E2. Accordingly, it is possible to realize the idle stop operation, thus improving gas mileage.

Meanwhile, the 42-V battery E2 is charged when the motor M2 is not driven and when charging of the 14-V battery E1 is not conducted. Accordingly, even when the terminal voltage of the 42-V battery E2 drops off, it is possible to increase the terminal voltage thereof quickly and thereby to get ready for starting the engine 1 at any time.

In addition, the control system includes the switches SW1 and SW2. The start of the engine 1, the charge of the 14-V battery E1, the charge of the 42-V battery E2, and the drive of the motor M2 are switched by opening and closing the respective switches. Accordingly, it is possible to ensure the smooth and safe switching operations, thereby improving reliability of the operations.

The preferred embodiments described herein are illustrative and not restrictive, and the invention may be practiced or embodied in other ways without departing from the spirit or essential character thereof. The scope of the invention being indicated by the claims, and all variations which come within the meaning according to claims are intended to be embraced herein.

The present disclosure relates to subject matters contained in Japanese Patent Application No. 2003-384958, filed on Nov. 14, 2003, the disclosure of which is expressly incorporated herein by reference in its entirety.

What is claimed is:

1. A control system for controlling a vehicle which has an engine for driving at least one of wheels thereof and a motor for driving at least one of the rest of the wheels thereof, the control system comprising:
   a motor generator configured to be driven by the engine for generating first alternating-current power at first voltage;
   an inverter which converts the first alternating-current power to second power at second voltage lower than the first voltage;
   a first battery to be charged with the second power supplied from the inverter;
   a capacitor device connected to the inverter, and
   a rectifier circuit which rectifies the first alternating-current power to third direct-current power at third voltage,
   wherein the motor is supplied with the third direct-current power, and
   the inverter is supplied with fourth power at fourth voltage discharged from the capacitor device and converts the fourth power to fifth alternating-current power at fifth voltage, and the motor generator is supplied with the fifth alternating-current power and generates driving force for starting the engine.

2. The control system according to claim 1, wherein, when starting the engine, if voltage of the capacitor device is below predetermined voltage, the inverter is supplied with sixth power at sixth voltage discharged from the first battery, increases the sixth power to seventh power at seventh voltage, and supplies the seventh power to the capacitor device for charging the capacitor device.

3. The control system according to claim 1, wherein the engine is started when a predetermined condition is satisfied.

4. The control system according to claim 3, wherein the predetermined condition is that an accelerator switch is turned on.

5. The control system according to claim 1, wherein the second power is direct-current power.

6. The control system according to claim 1, wherein the inverter rectifies the first alternating-current power to charge the capacitor device.

7. The control system according to claim 1, further comprising:
a first switch for changing electrical connection between the inverter and the first battery; and
a second switch for changing electrical connection between the inverter and the capacitor device, wherein,
when starting the engine, the second switch is closed and the first switch is opened, so that electricity can be supplied from the capacitor device to the inverter,
when charging the first battery, the first switch is closed and the second switch is opened, so that electricity can be supplied from the inverter to the first battery, and
when charging the capacitor device, the second switch is closed and the first switch is opened, so that electricity can be supplied from the inverter to the capacitor device.

8. The control system according to claim 7, further comprising:
a third switch for changing electrical connection between the motor generator and the motor, wherein,
when starting the engine, when charging the first battery, and when charging the capacitor device, the third switch is opened, and
when driving the motor, the first and second switches are opened and the third switch is closed, so that electricity can be supplied from the motor generator to the motor.

9. The control system according to claim 1, wherein the capacitor device comprises either a capacitor or a second battery.

10. A method of controlling a vehicle which has an engine for driving at least one of wheels thereof and a motor for driving at least one of the rest of the wheels thereof, the method comprising:

converting first alternating-current power at first voltage generated by a motor generator to second direct-current power at second voltage lower than the first voltage, supplying the second direct-current power to a battery for charging the battery;
rectifying the first alternating-current power generated by the motor generator to third direct-current power at third voltage, supplying the third direct-current power to the motor for driving the motor;
converting fourth electric power at fourth voltage discharged from a capacitor device to fifth alternating-current power at fifth voltage, supplying the fifth alternating-current power to a motor generator, starting the engine with driving force of the motor generator; and
rectifying the first alternating-current power generated by the motor generator, supplying the rectified power to the capacitor device for charging the capacitor device.

11. A control system for controlling a vehicle which has an engine for driving at least one of wheels thereof and a motor for driving at least one of the rest of the wheels thereof, the control system comprising:
a motor generator configured to be driven by the engine for generating first alternating-current power at first voltage;
an inverter which converts the first alternating-current power to second power at second voltage lower than the first voltage;
a first battery to be charged with the second power supplied from the inverter;
a capacitor device connected to the inverter,
a rectifier circuit which rectifies the first alternating-current power to third direct-current power at third voltage,
wherein the motor is supplied with the third direct-current power,
a first switch for changing electrical connection between the inverter and the first battery; and
a second switch for changing electrical connection between the inverter and the capacitor device, wherein,
when starting the engine, the second switch is closed and the first switch is opened, so that electricity can be supplied from the capacitor device to the inverter,
when charging the first battery, the first switch is closed and the second switch is opened, so that electricity can be supplied from the inverter to the first battery, and
when charging the capacitor device, the second switch is closed and the first switch is opened, so that electricity can be supplied from the inverter to the capacitor device.

* * * * *